US009772900B2

(12) United States Patent
Hu et al.

(10) Patent No.: US 9,772,900 B2
(45) Date of Patent: Sep. 26, 2017

(54) TIERED ECC SINGLE-CHIP AND DOUBLE-CHIP CHIPKILL SCHEME

(71) Applicant: Samsung Electronics Co., Ltd., Gyeonggi-do (KR)

(72) Inventors: Chaohong Hu, San Jose, CA (US); Uksong Kang, San Jose, CA (US); Hongzhong Zheng, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 100 days.

(21) Appl. No.: 14/606,334

(22) Filed: Jan. 27, 2015

(65) Prior Publication Data
US 2016/0011940 A1   Jan. 14, 2016

Related U.S. Application Data

(60) Provisional application No. 62/022,776, filed on Jul. 10, 2014.

(51) Int. Cl.
*G06F 11/10* (2006.01)
(52) U.S. Cl.
CPC ........ *G06F 11/1044* (2013.01); *G06F 11/106* (2013.01); *G06F 11/108* (2013.01); *G06F 11/1012* (2013.01); *G06F 11/1024* (2013.01); *G06F 11/1048* (2013.01); *G06F 2211/1057* (2013.01)
(58) Field of Classification Search
CPC ............. G06F 11/1044; G06F 11/1024; G06F 11/1048; G06F 11/106
See application file for complete search history.

(56) References Cited

U.S. PATENT DOCUMENTS

| | | | | | |
|---|---|---|---|---|---|
| 4,335,459 | A | * | 6/1982 | Miller ................. | G06F 11/1008 365/200 |
| 5,058,115 | A | * | 10/1991 | Blake ................. | G06F 11/1052 714/767 |
| 5,228,046 | A | * | 7/1993 | Blake ................. | G06F 11/1052 365/200 |
| 5,418,796 | A | * | 5/1995 | Price .................. | G06F 11/1028 714/753 |
| 5,535,226 | A | * | 7/1996 | Drake ................. | G06F 11/1008 714/718 |

(Continued)

OTHER PUBLICATIONS

"High Performance, Energy Chipkill Correct Memory with Multi-dimensional Parity," X. Jian, et al., IEEE Computer Architecture Letters, v 12, n 2, 39-42, Jul. 2013; ISSN: 1556-6056; DOI: 10.1109/L-CA.2012.21.

*Primary Examiner* — Joseph D Torres
(74) *Attorney, Agent, or Firm* — Convergent Law Group LLP (57) ABSTRACT

Exemplary embodiments provide a tiered error correction code (ECC) Chipkill system, comprising: a device ECC incorporated into at least a portion of a plurality of memory devices that corrects n-bit memory device-level failures in the respective memory device, and transmits a memory device failure signal when any memory device-level failure is greater than n-bits and beyond correction capability of the device ECC device; and a system-level ECC device external to the plurality of memory devices is responsive to receiving the memory device failure signal to correct the memory device failure based on a system ECC parity.

16 Claims, 6 Drawing Sheets

(56) References Cited

U.S. PATENT DOCUMENTS

| | | | |
|---|---|---|---|
| 6,233,716 B1* | 5/2001 | Cypher | G06F 11/1028 714/777 |
| 7,227,797 B2 | 6/2007 | Thayer et al. | |
| 7,712,010 B2 | 5/2010 | Dell | |
| 8,335,976 B2 | 12/2012 | Daga et al. | |
| 8,365,015 B1* | 1/2013 | Yu | G06F 9/3863 714/16 |
| 8,438,457 B2 | 5/2013 | Koshiyama et al. | |
| 8,448,042 B2 | 5/2013 | Spraul | |
| 8,615,700 B2* | 12/2013 | Dave | G06F 11/1068 714/773 |
| 2003/0003906 A1* | 1/2003 | Demers | H04B 1/7107 455/424 |
| 2003/0159092 A1* | 8/2003 | La Fetra | G11C 7/20 714/710 |
| 2006/0059406 A1* | 3/2006 | Micheloni | G06F 11/1048 714/763 |
| 2007/0011562 A1* | 1/2007 | Alexander | G06F 11/1004 714/758 |
| 2007/0050688 A1* | 3/2007 | Thayer | G06F 11/1004 714/100 |
| 2011/0307758 A1* | 12/2011 | Fillingim | G06F 11/1048 714/758 |
| 2013/0111295 A1 | 5/2013 | Li | |
| 2013/0326263 A1 | 12/2013 | Alameldeen | |
| 2014/0089726 A1* | 3/2014 | Warnes | G06F 11/1008 714/6.1 |

* cited by examiner

Prior Art

TIERED ECC SINGLE-CHIP AND DOUBLE-CHIP CHIPKILL SCHEME

CROSS-REFERENCE TO RELATED APPLICATIONS

This application claims the benefit of Provisional Patent Application Ser. No. 62/022,776, entitled "A TIERED ECC SINGLE-CHIP AND DOUBLE-CHIP CHIPKILL SCHEME FOR HIGH-END SERVER OR DATACENTER MEMORY SYSTEM APPLICATION" filed on Jul. 10, 2014, which is herein incorporated by reference.

BACKGROUND

Future memory technology requires strong error correction code (ECC) management because Raw Bit Error Rate (BER) becomes increasingly higher with memory technology scaling or in new/immature memory technology. Standard error-correcting code (ECC) dynamic random-access memory (DRAM) systems provide for automatic correction when a single data bit is in error and for guaranteed detection of two data bits in error. This capability is often referred to as Single Error Correction/Double Error Detection (SEC/DED).

ECC memory requires that some bits be dedicated to actual data and other bits dedicated to the ECC. DRAM devices, for example, are available in various data widths (number of data bits per device). For example, dual in-line memory modules (DIMMs) used in servers may be built using multiple ×4 (4 data bit), ×8, or ×16 DRAM devices.

Many types of errors that occur in DRAM devices only impact one data bit, regardless of the width of the device. However, some error modes will result in more than one data bit being in error, up to the entire data width of the device. Any of these multi-bit failure modes result in a fatal error for a SEC/DED memory system, because only a single bit can be corrected by standard ECC. As DRAM devices become denser, the percentage of errors that result in multibit failure increases. Chipkill correct is the ability of the memory system to withstand a multibit failure within a DRAM device and is widely used as a commercial solution on high-end servers to reduce system level BER.

Figure 1:
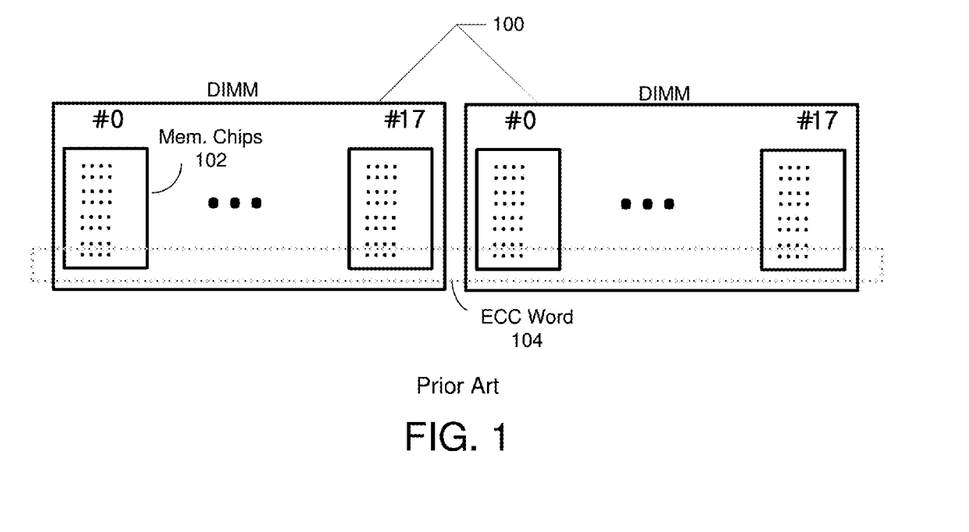
FIG. 1 is a block diagram illustrating an example of a conventional Chipkill scheme based on Reed-Solomon Error Correction Code.

FIG. 1 is a block diagram illustrating an example of a conventional Chipkill scheme based on Reed-Solomon Error Correction Code. Dual in-line memory modules (DIMMs) 100 are shown, each comprising 18 memory chips 102 (#0 through #17) that provide 4 bits each (×4 chips). To provide Chipkill corrected memory, each data bit of one of the memory chips 100 is included in a separate "ECC word" that is used by an ECC algorithm to provide error detection and correction.

The Chipkill may utilize 36 (18+18) 4-bit symbols from the two DIMMs to make a 144-bit ECC word 104 comprising 128 data bits and 16 ECC bits in lockstep mode (two memory channels operating as a single channel so that each write and read operation moves a data word two channels wide). Such a Chipkill scheme achieves single-symbol correcting (SSC) or single-chip error correction, and double-symbol detecting (DSD) or double-chip error detection. However, since two-DIMM lockstep (×144 bus-width) is required for this scheme, it reduces rank-level/bank-level parallelism by half and doubles prefetching energy with burst length of 8, compared with single DIMM non-lockstep operation.

BRIEF SUMMARY

The exemplary embodiment provides methods and systems for a tiered error correction code (ECC) system, comprising: a device ECC incorporated into at least a portion of a plurality of memory devices that corrects n-bit memory device-level failures in the respective memory device, and transmits a memory device failure signal when any memory device-level failure is greater than n-bits and beyond correction capability of the device ECC device; and a system-level ECC device external to the plurality of memory devices that is responsive to receiving the memory device failure signal to correct the memory device failure based on a system ECC parity.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The exemplary embodiments provide a tiered error-correcting code (ECC) single-chip and double-chip Chipkill system. The single-chip and double-chip Chipkill system corrects single chip failure and coordinates memory device ECC features with a system level ECC, and is capable of detecting any number of chip failures (single-chip Chipkill), correcting double chip failures, and detecting any number of chip failures (double-chip Chipkill). In one embodiment, a plurality of memory devices are provided with a device ECC that corrects memory device-level failures. Responsive to determining that a failure in one of the memory devices is beyond the correction capability of the device ECC, an error signal is transmitted to indicate that the device-level failure is to be corrected at the system-level by the system ECC.

Figure 2:
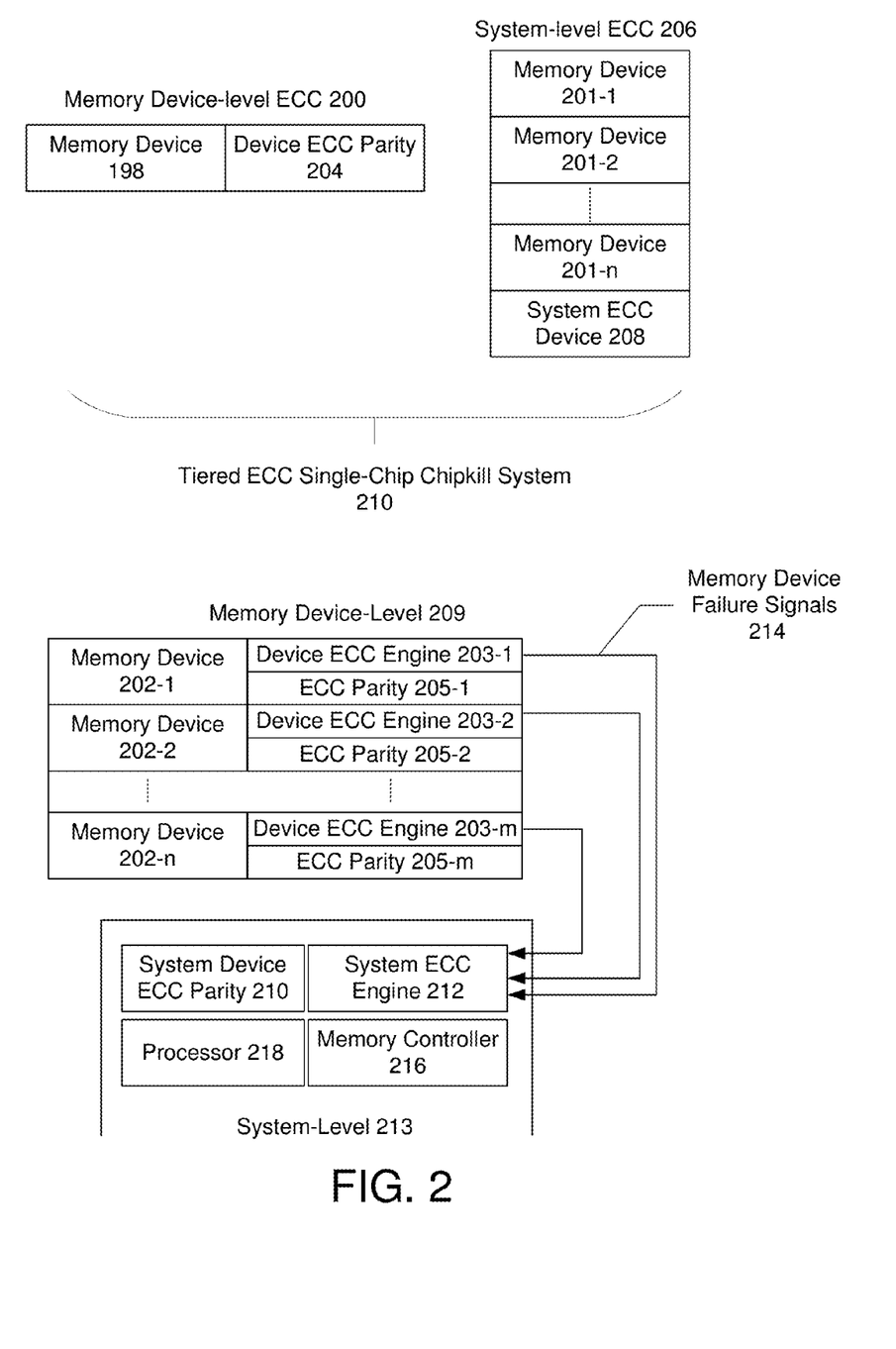
FIG. 2 is a block diagram graphically illustrating an algorithm concept for a tiered error-correcting code (ECC) scheme.

FIG. 2 is a block diagram graphically illustrating an algorithm concept for a tiered error-correcting code (ECC) scheme. According to an example embodiment, a memory device-level ECC 200 is combined with a system-level ECC 206 to produce a tiered ECC single-chip system 210. At the memory device-level ECC 200, a memory device 198 typically includes an incorporated or internal device ECC parity 204 (or device ECC). The system-level ECC 206 typically includes a plurality of the memory devices 200 (labeled 201-1, 201-2 . . . 201-$n$) and a system ECC Parity device 208. As is commonly known, parity checking is a method of detecting memory errors. Every byte has an associated parity bit, e.g., every eight data bits or 1 byte has one parity bit. The parity bit is typically added to the end of a string of bits and indicates whether the number of bits in the string with the value one is even or odd. The parity bit is set at write time, and then calculated and compared at read time to determine if any of the bits have changed since the data was stored.

According to an example embodiment, the tiered ECC single-chip system 210 may be created by combining the plurality of the memory devices 198 and associated device ECC parities 204 with the system-level ECC 206. According to one aspect of the exemplary embodiment, the tiered ECC single-chip Chipkill system 210 can correct a single memory device failure within the memory module and detect any number of memory device failures and their locations within a memory module.

As shown, the tiered ECC single-chip system 210 comprises a memory device-level 209 and a system-level 213. The memory device level 209 comprises multiple memory devices 202-1 through 202-$n$, each associated with a respective device ECC engine 203-1 through 203-$m$ and an ECC parity 205-1 through 205-$m$. The system-level 213 may represent a computer system, such as a high-end server or data center sever, that includes a system ECC engine/device 212, a system device ECC parity 210, a memory controller 216 that manages the flow of data to and from the computer's memory, and a processor 218 that executes instructions.

The device ECC engine 203-1 through 203-$m$ (collectively referred to as device ECC engine 203), is incorporated into at least a portion of the memory devices 202, for example as part of the ECC Parity 205. The device ECC engine 203 corrects memory device-level failures in the respective memory devices 202-1 through 202-$n$ (collectively referred to as memory devices 202). More specifically, the device ECC engine 203 may correct n-bit errors and detect greater than n-bit errors. When a memory device failure in one of the memory devices 202 is beyond the correction capability of the corresponding device ECC engine 203, i.e., greater than an n-bit error, the device ECC engine 203 transmits a memory device failure signal 214 as an error flag to inform the system-level 213 that there is an uncorrectable error in the corresponding memory device 202. The system ECC engine 212 is responsive to receiving the memory device failure signal 214 by correcting the memory device-level failures based on the system device ECC parity 210. In one embodiment, the system ECC engine 212 may be located external to the memory devices 202 either between the memory controller 216 and the memory devices 202, or inside the memory controller 216. During a read operation, the system ECC engine 212 passes data returned from the memory device 202 to the memory controller 216 in the absence of any memory device failure signal 214.

In one embodiment, the memory device failure signals 214 are transmitted by each memory device 202 to the system ECC engine 212 via existing data signal lines with an additional data burst or an extra signal line with an extra pin such that receipt of a particular memory device failure signal 214 automatically informs the system ECC engine 212 of the identity of the transmitting memory device 202 and hence the location of the error.

If the system ECC engine 212 receives the memory device failure signal 214 from one or two of the memory devices 202, then the system ECC engine 212 uses the system device ECC parity 210 to recover the data from the failed memory device 202, thereby implementing single-chip/double-chip chipkill. If the system ECC engine 212 receives the memory device failure signal 214 from more than one of the memory devices 202 for single-chip Chipkill, or two of the memory devices 202 for double-chip Chipkill, then the system ECC engine 212 transmits an uncorrectable error signal to the memory controller 216.

The example tiered ECC single-chip Chipkill system 210 can significantly reduce the cost of conventional Chipkill schemes: no lock-step operation is required, with ~50% energy savings and doubled parallelism, and a reliability improvement multiplication factor provided by the device ECC and system ECC. Note also that the presence of the chip-level failure signal 214 or error flag makes the system level ECC algorithm more efficient, as the system level ECC algorithm is informed of the locations the error(s) (as opposed to standard ECC algorithms, which are not informed of the location of the error(s)).

Figure 3A:
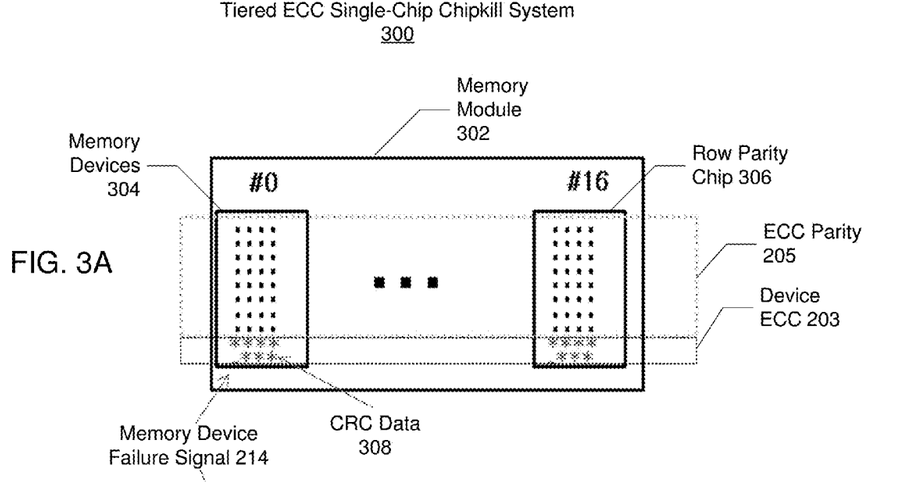
FIGS. 3A and 3B are block diagrams illustrating an architectural implementation of the tiered error-correcting code (ECC) single-chip Chipkill system at the memory device-level in accordance with one exemplary embodiment.
Figure 3B:
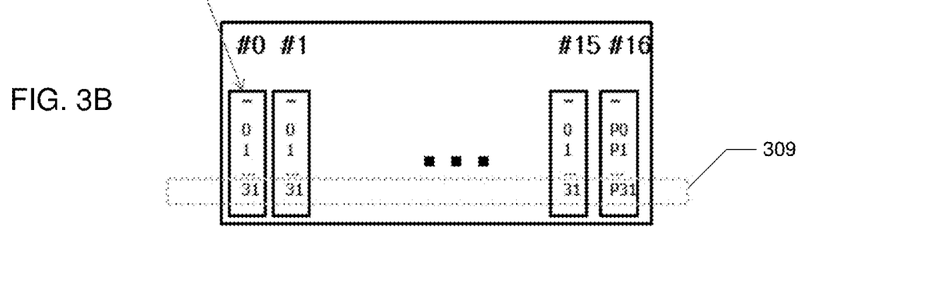

FIGS. 3A and 3B are block diagrams illustrating an architectural implementation of the tiered error-correcting code (ECC) single-chip Chipkill system at the memory device-level in accordance with one exemplary embodiment.

Referring to FIG. 3A, the memory device-level of the tiered ECC single-chip Chipkill system 300 comprises a single memory module (e.g., a dual in-line memory module (DIMM)) 302. The example tiered ECC single-chip Chipkill system 300 is illustrated with an x4 DRAM operating in independent mode, and can be extended to x8, x16, and the like, devices. In one embodiment, the memory module 302 may include a total of seventeen chips; sixteen memory devices 304 labeled #0 through #15, and an additional row parity chip 306 labeled #16 that contains parity information for the sixteen memory devices 304. The row parity chip 306 is the implementation of the ECC parity 205 of FIG. 2.

FIG. 3B is a diagram illustrating a row parity chip implementation in the memory module 302, including memory device failure signal 214 information. Parity digits are calculated by summing bits across each row of the memory devices 304 separately. For example, dashed box 309 graphically shows that the parity digit "P31" refers to parity for row 31, which may be calculated by summing the bits in row 31 of the memory devices 304. In one embodiment, the row parity chip 306 provides each of the memory devices 304 with n-bit correction capability and may be used to correct single chip failures, where in one embodiment, "n" may be 1 or 2.

According to the example embodiment, the memory devices 304 may incorporate a device ECC engine 203 that issues the memory device failure signal 214 (shown as a "-") to indicate the corresponding memory device 304 has >n-bit errors and that that system-level ECC should be performed.

In one embodiment, the memory device failure signal 214 may be integrated into a data-bus cyclic redundancy check (CRC) data 308 to protect system level data-bus I/O data integrity. Data-bus CRC data 308 at the device-level (shown as "********") protects system level data-bus I/O integrity. As is well-known, CRC is an error-detecting code commonly used in networks and storage devices to detect accidental changes to raw data. Blocks of data entering these systems get a short check value attached, and upon retrieval the calculation is repeated and corrective action taken against data corruption if the check values do not match. In one embodiment, the memory device failure signal 214 comprises 1 bit, the CRC data 308 comprises 7 bits, a burst length of the data-bus is increased from 8 bits to 10 bits, and the data CRC data 308 is optionally moved from the tail to the header of the burst for a total burst length of 10 (2+8).

Figure 4A:
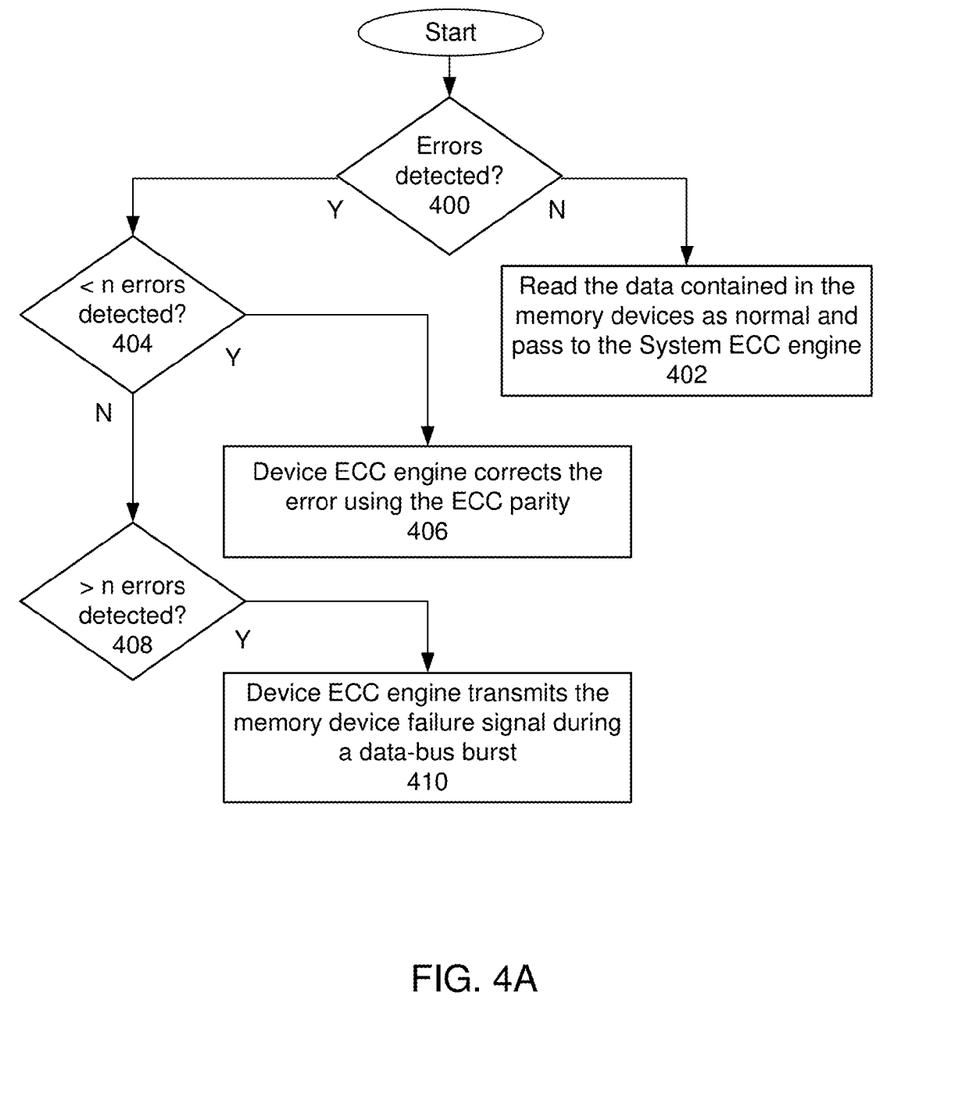
FIGS. 4A and 4B are flow diagrams illustrating a process for implementing a tiered ECC single-chip Chipkill scheme in one embodiment.
Figure 4B:
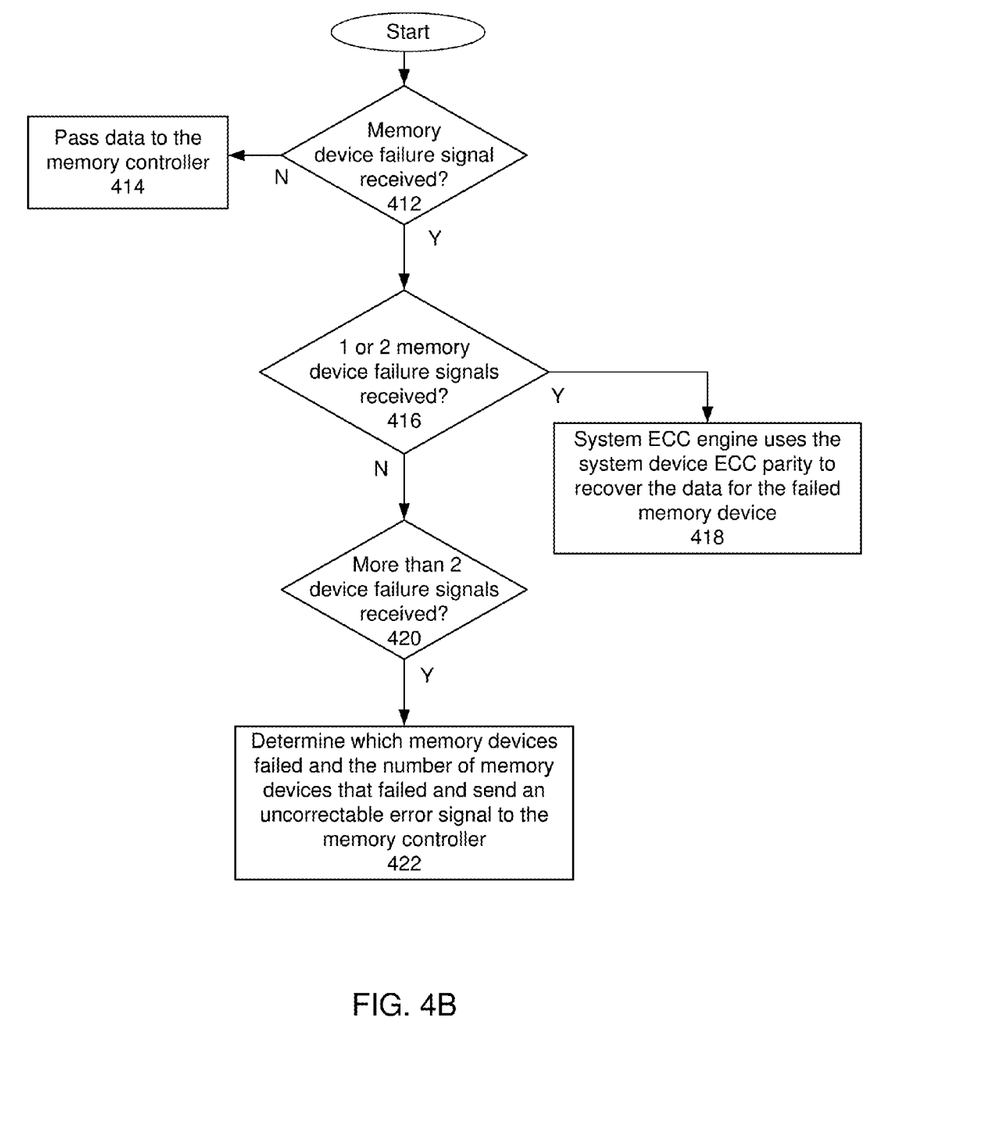

FIGS. 4A and 4B is a flow diagram illustrating a process for implementing a tiered ECC single-chip Chipkill scheme in one embodiment. FIG. 4A is a flow diagram illustrating the process within a memory device 202. If no errors are detected by the device's device ECC engine 203 (block 400), the data contained in the memory device can be read out as normal and passed to the system ECC engine 212 (block 402). When n-bit or less memory device errors are detected (block 404), then the device ECC engine 203 corrects the error using the ECC parity, e.g., the row parity chip 306 and passes the data to the system ECC engine 212 (block 406). For example, assuming chip #0 fails, the row parity chip 306 is used to recover the chip #0 data. When more than n-bit errors are detected (block 408), then the device ECC engine 203 transmits the memory device failure signal 214 during a data-bus burst (block 410).

FIG. 4B is a flow diagram illustrating the process performed by the system ECC device 212. It is first determined if any memory device failure signals are received (block 412). If no memory device failure signals are received, then the system ECC device 212 passes data received from the memory devices to the memory controller 216 (block 414). Responsive to the system ECC engine 212 receiving one memory device failure signal 214 for single-chip Chipkill or two for double-chip Chipkill and determining which memory device(s) failed based on the memory device failure signals (block 416), the system ECC engine 212 uses the system device ECC parity 210 to recover the data for the failed memory devices (block 418).

Responsive to the system ECC engine 212 receiving more than one memory device failure signals (block 420), the system ECC engine 212 determines which ones of the memory devices failed and the number of memory devices that failed based on the memory device failure signals, and sends an uncorrectable error signal to the memory controller 216 regarding the same (block 422).

Figure 5A:
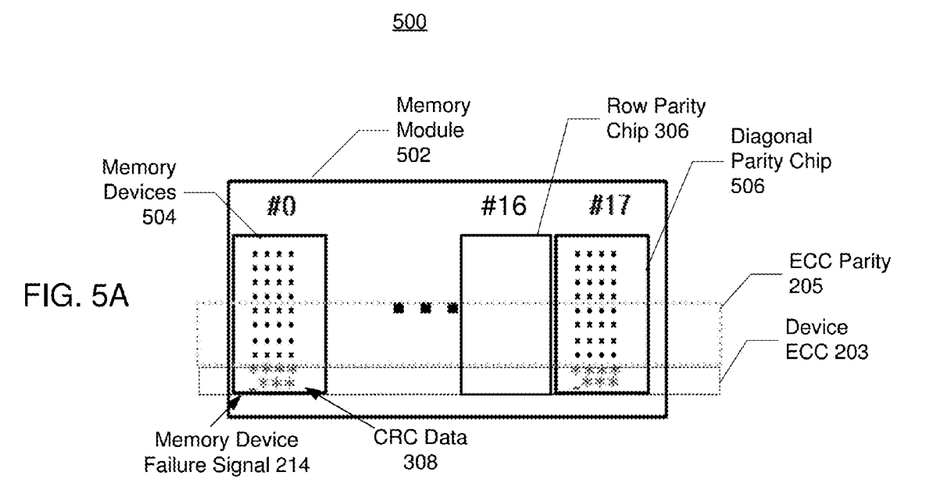
FIGS. 5A and 5B are block diagrams illustrating an architectural implementation of a tiered ECC double-chip Chipkill system at a memory device-level in accordance with one exemplary embodiment.
Figure 5B:
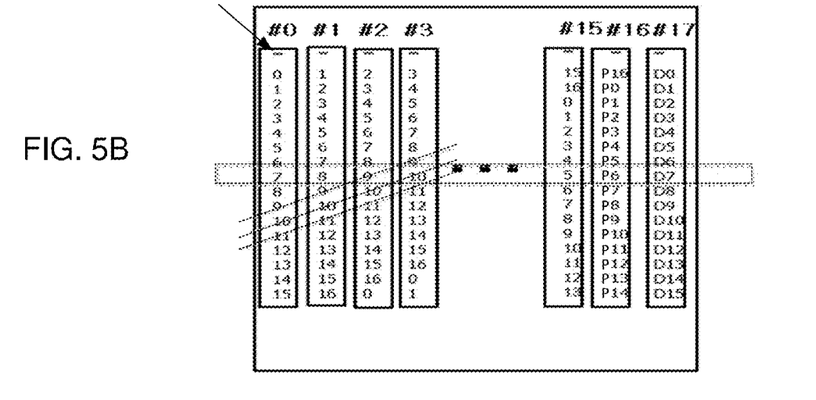

FIGS. 5A and 5B are block diagrams illustrating an architectural implementation of a tiered ECC double-chip Chipkill system at a memory device-level in accordance with one exemplary embodiment, where like components from FIGS. 3A and 3B have like reference numerals. The tiered ECC double-chip Chipkill system 500 extends the single-chip correction of the single-chip Chipkill system described above to provide double-chip correction plus the ability to detect any number of failures in the memory devices 504 comprising a memory module 502.

In addition to the sixteen memory devices 304 labeled #0 through #15, and the row parity chip 306 labeled #16 in the tiered ECC single-chip Chipkill system, the tiered ECC double-chip Chipkill system 500 adds a second additional memory device #17 as an across-chip diagonal parity chip 506 that contains parity information for the sixteen memory devices 504. The diagonal parity chip 506 is for performing diagonal parity checks and may use RAID6 dual parity to correct double-chip failures using the memory device failure signal 214.

FIG. 5B is a diagram illustrating a RAID6 dual parity check implementation in the memory module 502 including memory device failure signal 214 information. "Dy" in device #17, the diagonal parity chip 506, represents a memory device number where "y" equals 0 to 16. Thus, the diagonal parity chip 506 contains parity of all bits in the memory devices 504 at location "y". "Px" in device #16, the row parity chip 306, represents parity of row "x", which can be distributed into device #0 to device #16 (e.g., reverse diagonal).

In operation, when n or less memory device level errors are detected, then the memory device in which the error occurred corrects the error using the ECC parity, e.g., the row parity chip 306.

When there are two memory device level failures, and two different memory device failure signals 214 are issued by the corresponding memory devices, the system ECC engine 212 uses the across-chip diagonal parity chip 506 and the across-chip row parity chip 306 alternatively to recover the failed memory devices bit by bit (32 cycles is required for 2*16 bits). D0 in the diagonal parity chip 506 examines all the "0" positions in all the memory devices 504. In the example shown, in device #0, "0" is in the first position; in device #1, "0" is not present; and in device #2, "0" is in the last position.

As an example, assume that both memory devices #0 and #3 have uncorrectable errors, and issue corresponding memory device failure signals 214. During recovery, the system ECC in 212 only uses D2 to correct the "2" position in device #0 because for device #3, "2" is not present, which means for diagonal D2, there is only one error. The system ECC engine 212 then uses P2 to correct "5" in device #3; uses D5 to correct device "5" in #0 and uses P5 to correct "8" in device #3; then uses D8 to correct "8" in #0 and uses P8 to correct "11" in #3; and the like until 2*16 bits are corrected.

Responsive to the system ECC engine 212 receiving more than two memory device failure signals 214, the system ECC engine 212 determines which ones of the memory devices failed and the number of memory devices that failed based on the hardwiring of the memory device failure signals.

The tiered error correction code (ECC) single-chip and double-chip Chipkill system of the exemplary embodiments corrects single chip failure and detects any number of chip failures (single-chip Chipkill embodiment), and corrects double chip failures and detects any number of chip failures (double-chip Chipkill embodiment), by coordinating memory device ECC features with a system ECC. According to the exemplary embodiments, additional parity chips maybe used to correct errors in respective additional memory devices.

A tiered error correction code (ECC) single-chip and double-chip Chipkill system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A tiered error correction code (ECC) system, comprising:
    a memory device-level comprising a plurality of memory devices within a memory module, and a device ECC apparatus associated with the plurality of memory devices, wherein the device ECC apparatus comprises a device ECC engine in each of the plurality of memory devices, and a row parity chip that comprises one of the plurality of memory devices and contains parity information for the plurality of memory devices;
    wherein the device ECC engine corrects n-bit memory device-level failures in the respective memory device using the parity information in the row parity chip, and transmits a memory device failure signal when any memory device-level failure is greater than n-bits and beyond correction capability of the device ECC device; and
    a system-level comprising a system-level ECC engine and a system ECC device parity, wherein the system-level ECC device is external to the plurality of memory devices and is responsive to receiving the memory device failure signal to correct the memory device failure based on the system ECC parity.

2. The system of claim 1, wherein the tiered ECC system corrects a single memory device failure and detects any number of device failures and their locations within a memory module.

3. The system of claim 1, wherein the memory device failure signal transmitted by the memory devices comprises an ECC failure signal, the ECC failure signal transmitted using an additional data-bus burst or an extra pin, such that receipt of a particular memory device failure signal automatically informs the system ECC engine of an identity of the transmitting memory device and a location of the error.

4. The system of claim 1, wherein the row parity chip provides the memory devices with n-bit correction capability and is used to correct single chip failures, where n equals one or two.

5. A method of providing a tiered ECC system, comprising:
    at a memory device-level comprising a plurality of memory devices within a memory module, associating a device ECC apparatus with the plurality of memory devices wherein the device ECC apparatus comprises a device ECC engine in each of the plurality of memory devices, and a row parity chip that comprises one of the plurality of memory devices and contains parity information for the plurality of memory devices;
    using the device ECC engine to correct n-bit memory device-level failures in the respective memory device using the parity information in the row parity chip, and to transmit a memory device failure signal when any memory device-level failure is greater than n-bits and beyond correction capability of the device ECC device; and
    at a system-level comprising a system-level ECC engine and a system ECC device parity, using a system-level ECC device external to the plurality of memory devices that is responsive to receiving the memory device failure signal to correct the memory device failure based on the system ECC parity.

6. The method of claim 5, further comprising: using the tiered ECC system to correct a single memory device failure and to detect any number of device failures and their locations within a memory module.

7. The method of claim 5, wherein the memory device failure signal transmitted by each of the at least a portion of the memory devices comprises an ECC failure signal, the ECC failure signal transmitted using an additional data-bus burst or an extra pin, such that receipt of a particular memory device failure signal automatically informs the system ECC engine of an identity of the transmitting memory device and a location of the error.

8. The method of claim 5, wherein the row parity chip provides the memory devices with n bit correction capability and is used to correct single chip failures, where n equals one or two.

9. A tiered error correction code (ECC) system, comprising:
    a memory device-level comprising a plurality of memory devices within a memory module;
    a device ECC engine in each of the plurality of memory devices;
    a row parity chip that comprises one of the plurality of memory devices and contains parity information for the plurality of memory devices;
    wherein the device ECC engine corrects n-bit memory device-level failures in the respective memory device using the parity information in the row parity chip, and transmits a memory device failure signal when any memory device-level failure is greater than n-bits and beyond correction capability of the device ECC device;

wherein the memory device failure signal is integrated into a data-bus cyclic redundancy check (CRC) data, and wherein the memory device failure signal comprises 1 bit, the CRC data comprises 7 bits, and a burst length of the data-bus is increased to 10; and a system-level comprising a system-level ECC engine and a system ECC device parity, wherein the system-level ECC device is external to the plurality of memory devices and is responsive to receiving the memory device failure signal to correct the memory device failure based on the system ECC parity.

10. A tiered error correction code (ECC) system, comprising:

a memory device-level comprising a plurality of memory devices within a memory module;

a device ECC engine in each of the plurality of memory devices;

a row parity chip that comprises one of the plurality of memory devices and contains parity information for the plurality of memory devices;

wherein the device ECC engine corrects n-bit memory device-level failures in the respective memory device using the parity information in the row parity chip, and transmits a memory device failure signal when any memory device-level failure is greater than n-bits and beyond correction capability of the device ECC device;

a diagonal parity chip to extend single-chip correction of a single-chip Chipkill system to a tiered ECC double-chip Chipkill system that performs double-chip correction plus an ability to detect any number of failures in the memory devices comprising the memory module; and a system-level comprising a system-level ECC engine and a system ECC device parity, wherein the system-level ECC device is external to the plurality of memory devices and is responsive to receiving the memory device failure signal to correct the memory device failure based on the system ECC parity.

11. The system of claim 10, wherein when there are two memory device failures and two corresponding memory device failure signals, and wherein the system ECC engine uses the diagonal parity chip and the row parity chip alternatively to recover data from the failed memory devices.

12. The system of claim 11, wherein responsive to the system ECC engine receiving more than two memory device failure signals, the system ECC engine determines which ones of the memory devices failed and the number of memory devices that failed based on the memory device failure signals and sends an uncorrectable error signal to a memory controller.

13. A method of providing a tiered ECC system, comprising:

at a memory device-level comprising a plurality of memory devices within a memory module, associating a device ECC apparatus with the plurality of memory devices, wherein the device ECC apparatus comprises a device ECC engine in each of the plurality of memory devices, and a row parity chip that comprises one of the plurality of memory devices and contains parity information for the plurality of memory devices;

using the device ECC engine to correct n-bit memory device-level failures in the respective memory device using the parity information in the row parity chip, and to transmit a memory device failure signal when any memory device-level failure is greater than n-bits and beyond correction capability of the device ECC device;

integrating the memory device failure signal into a data-bus cyclic redundancy check (CRC) data, wherein the memory device failure signal comprises 1 bit, the CRC data comprises 7 bits, and a burst length of the data-bus is increased to 10; and at a system-level comprising a system-level ECC engine and a system ECC device parity, using a system-level ECC device external to the plurality of memory devices that is responsive to receiving the memory device failure signal to correct the memory device failure based on the system ECC parity.

14. The method of claim 13, wherein when there are two memory device failures and two corresponding memory device failure signals, the system ECC engine uses the diagonal parity chip and the row parity chip alternatively to recover data from the failed memory devices.

15. The method of claim 14, wherein responsive to the system ECC engine receiving more than two memory device failure signals, determining by the system ECC engine which ones of the memory devices failed and the number of memory devices that failed based on the memory device failure signals and sends an uncorrectable error signal to a memory controller.

16. A method of providing a tiered ECC system, comprising:

at a memory device-level comprising a plurality of memory devices within a memory module, associating a device ECC apparatus with the plurality of memory devices, wherein the device ECC apparatus comprises a device ECC engine in each of the plurality of memory devices, and a row parity chip that comprises one of the plurality of memory devices and contains parity information for the plurality of memory devices;

using the device ECC engine to correct n-bit memory device-level failures in the respective memory device using the parity information in the row parity chip, and to transmit a memory device failure signal when any memory device-level failure is greater than n-bits and beyond correction capability of the device ECC device;

providing the memory module with a diagonal parity chip to extend single-chip correction of a single-chip Chipkill system to a tiered ECC double-chip Chipkill system that performs double-chip correction plus an ability to detect any number of failures in the memory devices comprising the memory module;

at a system-level comprising a system-level ECC engine and a system ECC device parity, using a system-level ECC device external to the plurality of memory devices that is responsive to receiving the memory device failure signal to correct the memory device failure based on the system ECC parity.

\* \* \* \* \*